US010394955B2

(12) United States Patent
Fauceglia et al.

(10) Patent No.: US 10,394,955 B2
(45) Date of Patent: Aug. 27, 2019

(54) RELATION EXTRACTION FROM A CORPUS USING AN INFORMATION RETRIEVAL BASED PROCEDURE

(71) Applicant: International Business Machines Corporation, Armonk, NY (US)

(72) Inventors: Nicolas R. Fauceglia, New York, NY (US); Alfio Massimiliano Gliozzo, Brooklyn, NY (US); Gaetano Rossiello, Palo Del Colle (IT)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/851,255

(22) Filed: Dec. 21, 2017

(65) Prior Publication Data
US 2019/0197104 A1    Jun. 27, 2019

(51) Int. Cl.
*G06F 17/27* (2006.01)
*G06N 20/00* (2019.01)
(Continued)

(52) U.S. Cl.
CPC .......... *G06F 17/278* (2013.01); *G06F 16/313* (2019.01); *G06F 16/3344* (2019.01); *G06N 20/00* (2019.01)

(58) Field of Classification Search
CPC ............. G06F 17/278; G06F 17/30616; G06F 17/30684; G06F 15/18
See application file for complete search history.

(56) References Cited

U.S. PATENT DOCUMENTS 9,043,339 B2    5/2015  Ikawa et al.
2004/0260697 A1  12/2004  Ohnuma et al.
(Continued)

FOREIGN PATENT DOCUMENTS

JP    2011227688 A  * 11/2011
WO   2015080561 A1    6/2015

OTHER PUBLICATIONS

Bonan Min, Shuming Shi, Ralph Grishman, and Chin-Yew Lin, "Ensemble semantics for large-scale unsupervised relation extraction," In Proceedings of the 2012 Joint Conference on Empirical Methods in Natural Language Processing and Computational Natural Language Learning, pp. 1027-1037. Association for Computational Linguistics, 2012.
(Continued)

*Primary Examiner* — Stella L. Woo
(74) *Attorney, Agent, or Firm* — Garg Law Firm, PLLC; Rakesh Garg; Grant Johnson (57) ABSTRACT

An input entity pair including a first entity and a second entity is received. The first entity and the second entity are associated by a particular relation. A first set of statements containing the first entity and a second set of statements containing the second entity is are received from a corpus. A first set of discriminative words in the first set of statements and a second set of discriminative words in the second set of statements are identified. Perceptions in the first set of discriminative words and the second set of discriminative words are identified. A predetermined number of ranked statements is retrieved from the corpus using the identified perceptions as a query. Candidate entity pairs are extracted from the predetermined number statements. The candidate entity pairs have a relation therebetween analogous to the relation between the first entity and the second entity.

20 Claims, 5 Drawing Sheets (51) Int. Cl.
*G06F 16/31* (2019.01)
*G06F 16/33* (2019.01)

(56) References Cited

U.S. PATENT DOCUMENTS

| | | |
|---|---|---|
| 2009/0019032 A1 | 1/2009 | Bundschus et al. |
| 2014/0082003 A1 | 3/2014 | Feldman et al. |
| 2015/0106081 A1* | 4/2015 | Chee .................. G06F 17/279 704/9 |
| 2018/0196881 A1* | 7/2018 | Lundin ............. G06F 17/30867 |

OTHER PUBLICATIONS

Aldo Gangemi, "A comparison of knowledge extraction tools for the semantic web," In Extended Semantic Web Conference, pp. 351-366. Springer, Berlin, Heidelberg, 2013.
Reza Sadoddin, and Osvaldo Driollet, "Mining and Visualizing Associations of Concepts on a Large-Scale Unstructured Data," 2016 IEEE Second International Conference on Big Data Computing Service and Applications (BigDataService), Year: 2016, pp. 216-224.

* cited by examiner

RELATION EXTRACTION FROM A CORPUS USING AN INFORMATION RETRIEVAL BASED PROCEDURE

TECHNICAL FIELD

The present invention relates generally to a method, system, and computer program product for relation extraction from a corpus. More particularly, the present invention relates to a method, system, and computer program product for information retrieval based relation extraction from a corpus.

BACKGROUND

Information retrieval in the context of retrieving information from a corpus of text documents is the process of searching the content of text documents to obtain information contained within or conveyed by the text documents. A corpus often includes a large and unstructured collections or sets of text documents such as web pages, news documents, broadcast transcripts, electronic books and other sources of textual information that are stored within one or more document repositories. Entity relation detection is a form of information extraction in which semantic relations between entities are determined from the text of the corpus often using machine learning techniques such as natural language processing (NLP). Examples of entities that may be contained within the corpus include, for example, persons, organizations, companies, locations, objects, and countries. Examples of relations that may exist within entities includes, for example, a person-affiliation and organization-location.

A number of techniques exist to perform relation extraction from a corpus of text documents including supervised relation extraction, open information extraction, universal schema and distant supervision. Supervised relation extraction often requires manual human labeling of entity relationships within existing training data. A significant disadvantage of supervised relation extraction is that it requires a large amount of labelled relations within the training data which is expensive to obtain and often does not generalize for obtaining different relations than those contained within the training data. Open information extraction identifies sequences of words in sentences that denote relations between two entities. However, open information extraction is computationally intensive and does not scale well to larger document sets.

Universal schema relation extraction combines information from an existing knowledge base and open information extraction techniques to perform relation extraction upon a collection of documents using matrix factorization methodologies. Distant supervision for relation extraction uses an existing semantic knowledge base consisting of entities and relations between them to find sentences containing those entities in a large unlabeled corpus and extract linguistic and syntactic features to train a classifier.

The illustrative embodiments recognize that existing procedures for extracting relations from a corpus require a large amount of training data and also include deep learning based implementations that are computationally intensive during the training phase.

SUMMARY

The illustrative embodiments provide a method, system, and computer program product. An embodiment of a method for relation extraction from a corpus includes receiving an input entity pair including a first entity and a second entity, the first entity and the second entity being associated by a particular relation. The embodiment further includes retrieving a first set of statements containing the first entity from a corpus, and retrieving a second set of statements containing the second entity from the corpus. The embodiment further includes identifying, by a processor and a memory, a first set of discriminative words in the first set of statements, and identifying, by the processor and the memory, a second set of discriminative words in the second set of statements. The embodiment further includes identifying perceptions in the first set of discriminative words and the second set of discriminative words, and retrieving a predetermined number of ranked statements from the corpus using the identified perceptions as a query. The embodiment further includes extracting candidate entity pairs from the predetermined number statements. The candidate entity pairs have a relation therebetween analogous to the relation between the first entity and the second entity. Thus, the embodiment provides a solution to existing problems in relation extraction by providing for relation extraction from a corpus using an information retrieval based procedure in which a minimal number of examples of entity pairs are required to be provided to obtain acceptable relation extraction results.

Another embodiment further includes ranking the extracted candidate entity pairs based on a frequency of the entity pairs in the ranked statements to form ranked output entity pairs. Another embodiment further includes outputting a list of the ranked output entity pairs. An embodiment further includes outputting supporting evidence for at least one of ranked output entity pairs, the supporting evidence including excerpts from the corpus indicative of the relation between the entities of the output entity pair.

In another embodiment, the input entity pair is received from a user. In another embodiment, the corpus includes a set of textual documents. In another embodiment, identifying the perceptions in the first set of discriminative words and the second set of discriminative words further includes ranking the perceptions, and selecting a predetermined number of the ranked perceptions.

In another embodiment, identifying the first set of discriminative words and identifying the second set of discriminative words is based upon a term frequency-inverse document frequency (TF-IDF) procedure. In another embodiment, the perceptions include common words in the first set of discriminative words and the second set of discriminative words.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments recognize that the presently available tools or solutions do not address these needs or provide adequate solutions for these needs. The illustrative embodiments used to describe the invention generally address and solve the above-described problems and other problems related to relation extraction from a corpus using an information retrieval based procedure.

In an embodiment, a pair of words/entities is provide to a relation extraction application and the relation extraction application identifies analogous entity pairs within a corpus of text documents having the same or a similar relation to one another as the input pair entities have to one another. In the embodiment, the relation extraction application extracts the analogous pairs from the corpus using an information retrieval based algorithm as further described herein. In one or more embodiments, the information retrieval based algorithm uses statistics from the corpus to perform relation extraction from the corpus. In an embodiment, the relation extraction application ranks the extracted entity pairs based upon a frequency of occurrence of the entity pairs and outputs a ranked list of the output pairs from the corpus. In a particular embodiment, the relation extraction application further outputs supporting evidence for each extracted output pair including excerpts from the corpus indicative of the relation between the entities of the output pair.

In an algorithm according to an embodiment, the relation extraction application receives an input pair (a, b) from a user in which a first entity (a) and a second entity (b) are associated by a particular relation. In a particular example, entity (a) is a "Person A" and entity (b) is an "Organization B" is which a relation between entity (a) and entity (b) is that "Person A" is the chief executive officer (CEO) of "Organization B". In the embodiment, the relation extraction application retrieves sentences (A) from the corpus (or a subset of the corpus) containing entity (a) and sentences (B) from the corpus (or a subset of the corpus) containing entity (b). In the embodiment, the relation extraction application identifies discriminative words in sentences (A) and sentences (B) in which a discriminative word is relevant to determining a relation between entities within the corpus.

In a particular embodiment, the relation extraction application uses a term frequency-inverse document frequency (TF-IDF) procedure for determining discriminative words within a corpus. TF-IDF is a numerical statistic that is intended to reflect how important a word is to a document in a corpus. The TF-IDF value increases proportionally to the number of times a word appears in a document of the corpus offset by the frequency of the word in the corpus to compensate for words that appear more frequently in general in the corpus.

In the embodiment, the relation extraction application identifies common words, referred to herein as perceptions (P), in the two sets of discriminative words. In a particular embodiment, relation extraction application identifies perceptions (P) using an argument vector space model (VSM). A VSM is an algebraic model for representing text documents as vectors including a number of terms in which each term represents a single word or phrase from the corpus.

In the embodiment, the relation extraction application retrieves a predetermined number k of top ranked sentences from the corpus using perceptions (P) as a query (D). In the embodiment, the relation extraction application extracts the entity pairs in D and ranks the extracted entity pairs based on the frequency of the entity pairs in the ranked sentences. In an embodiment, the relation extraction application further extracts supporting evidence supporting evidence for each extracted output pair including excerpts from the corpus indicative of the relation between the entities of the output pair.

In one or more embodiments, the extracted output pair are used for slot filling in a fast domain adaptation (FDA) engine for a cognitive application utilizing machine learning residing on a server. Slot filling is a procedure used to complete all known information about a queried entity. Fast domain adaptation is used to train a model for extracting of entity relation information from a corpus.

Various embodiments described herein may provide one or more advantages over existing procedure for relation extraction. One advantage that may be provided by one or embodiments includes that the relation extraction procedure described herein does not require offline training at the time of ingestion. Another advantage that may be provided by one or more embodiments includes that the relation extraction procedure described herein can be implemented on top of existing information retrieval technology to provide for scalability and robustness. Another advantage that may be provided by one or more embodiments includes that the relation extraction procedure described herein can be integrated into a search engine. Still another advantage that may be provided by one or more embodiments includes that a minimal number of examples of entity pairs are required to be provided to obtain acceptable relation extraction results.

The illustrative embodiments are described with respect to certain types of data retrieval and relation extraction processes, network devices, transmissions, validations, responses, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
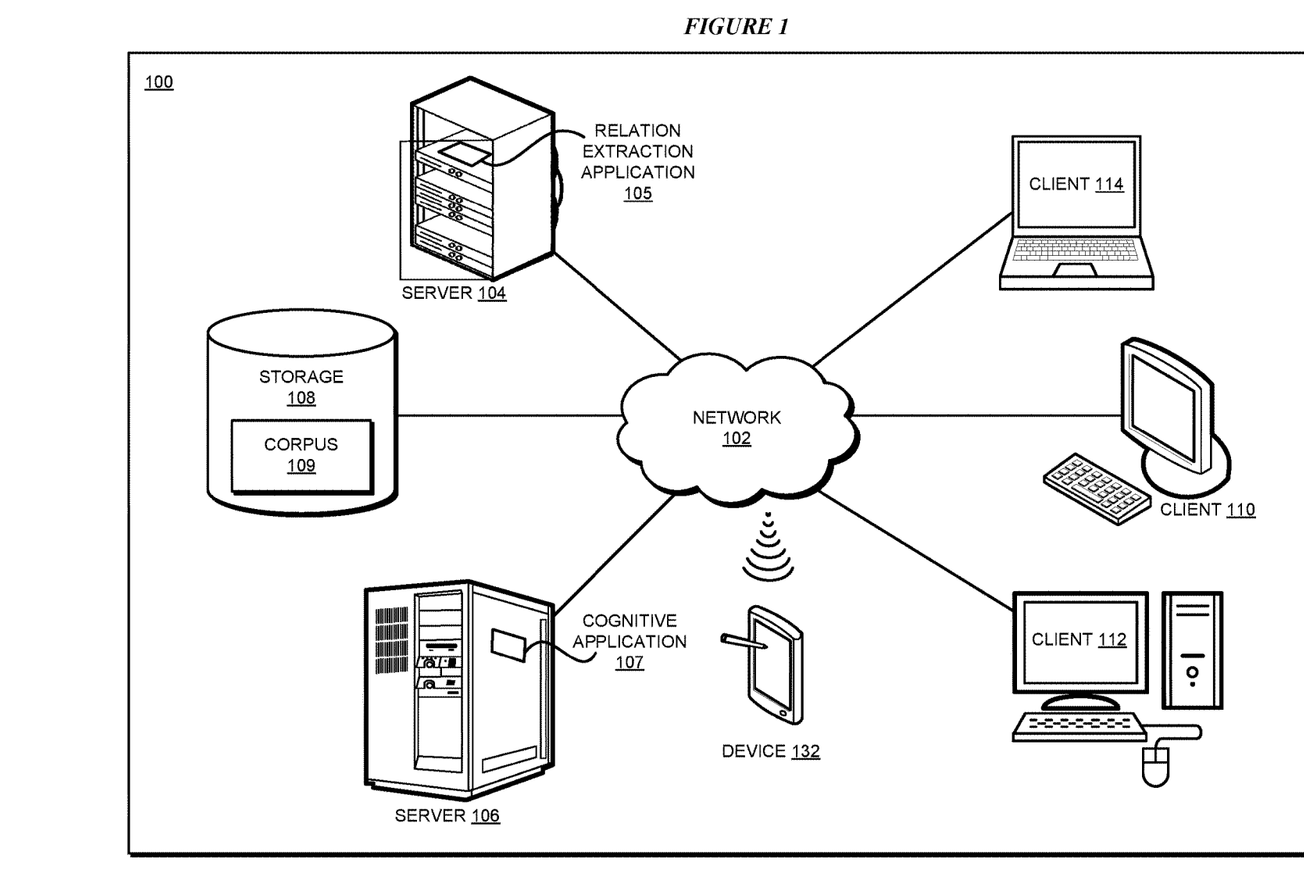
FIG. 1 depicts a block diagram of a network of data processing systems in which illustrative embodiments may be implemented.
Figure 2:
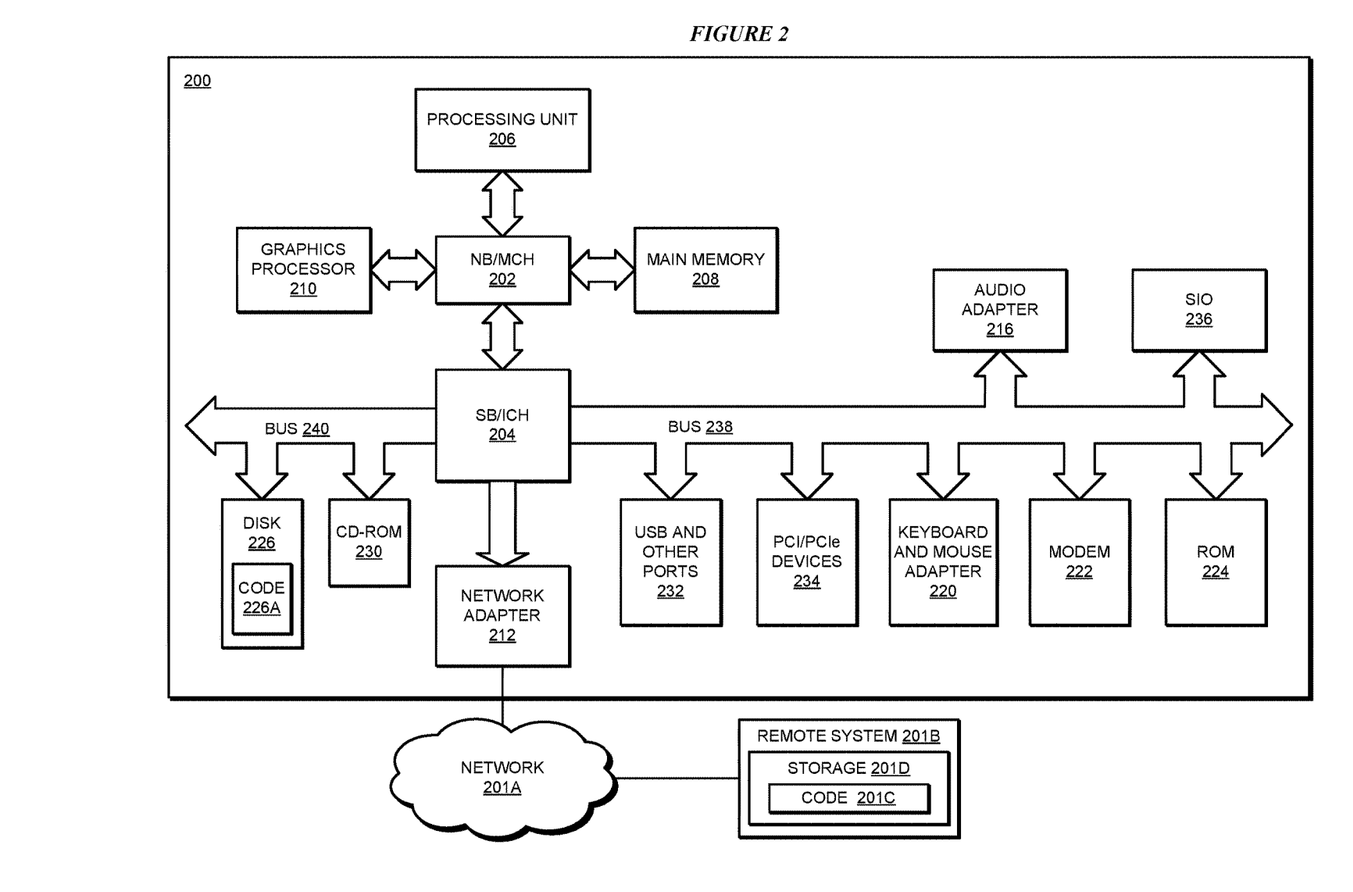
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. In one or more embodiments, storage 108 may be configured to store text documents within a corpus 109. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Relation extraction application 105 of server 104 implements an embodiment of an algorithm for relation extraction from a corpus as described herein. Cognitive application 107 implements one or more cognitive learning processes on textual data such as natural language processing (NLP) as described herein with respect to various embodiments.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein in which computer usable program code or instructions implementing the processes of the illustrative embodiments may be located. Data processing system 200 is described as a computer only as an example, without being limited thereto. Implementations in the form of other devices may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as applications 105 and 107 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
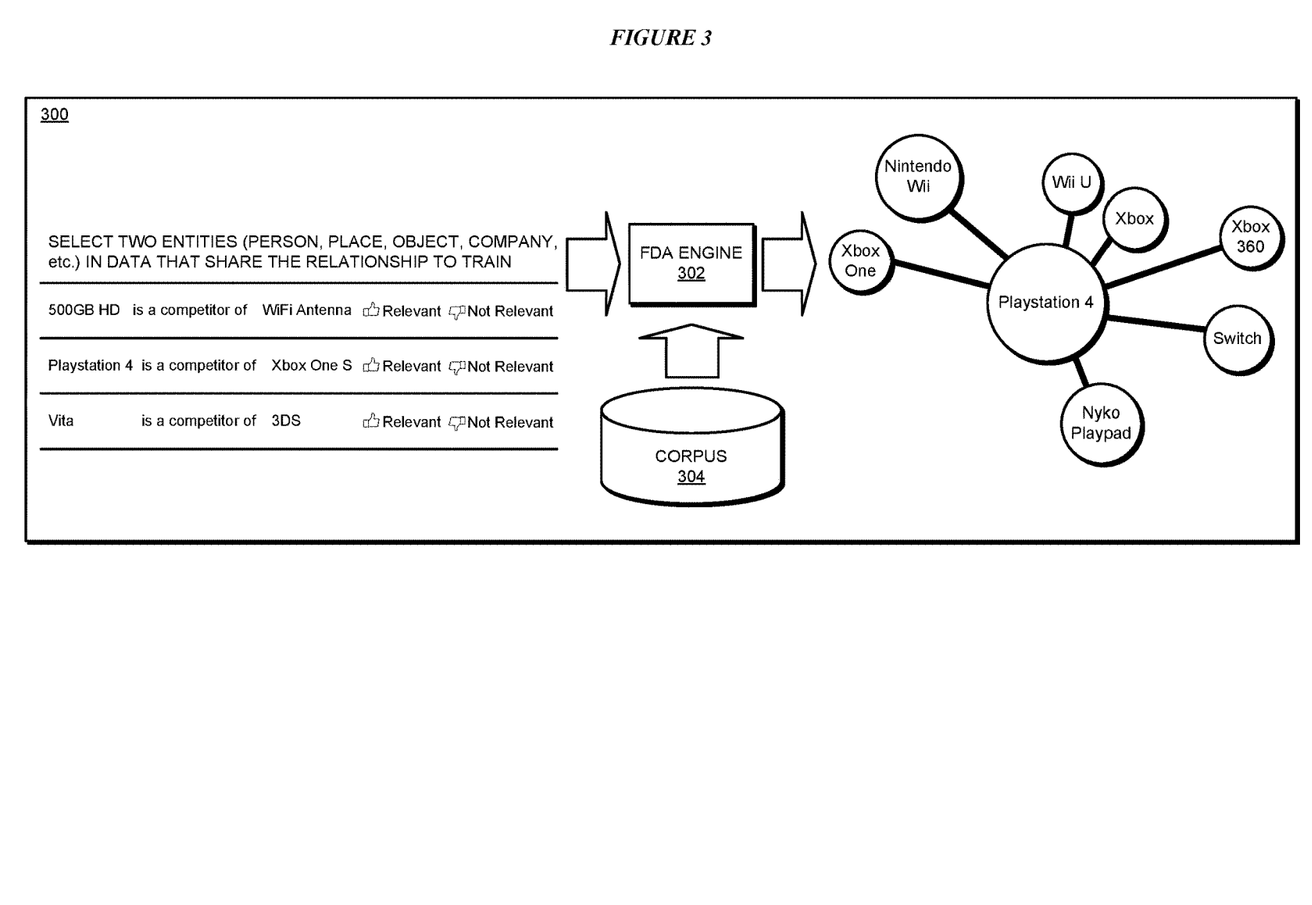
FIG. 3 depicts a block diagram of slot filling in a fast domain adaptation (FDA) engine for a cognitive application in accordance with an embodiment.

With respect to FIG. 3, this figure depicts a block diagram 300 of slot filling in a fast domain adaptation (FDA) engine for a cognitive application in accordance with an embodiment. In the illustrated embodiment, a user selects two input entities in data as an entity pair that share a relationship for which the user wants to train a cognitive application such as cognitive application 107. In a particular example, each of the selected entities includes a person, place, object or company. A fast domain adaptation engine 302 receives the selection of entities and outputs a list of ranked analogous pairs of entities from a corpus 304 that have an analogous relationship to one another to that of the input entity pair. In the particular example of FIG. 3, the user desires to explore a "competitor of" relationship between entities such as a "Playstation 4" being a competitor of an "Xbox One S". In the example, a "500 GB hard drive" "competitor of" relation to a "WiFi antenna" is not relevant to exploring a "competitor of" relation between the "Playstation 4" and the "Xbox One S", and a "Playstation Vita" "competitor of" relation to a "Nintendo 3DS" may not be relevant to exploring a "competitor of" relation between the "Playstation 4" and the "Xbox One S". In the example, FDA engine 302 outputs ranked pairs from corpus 304 indicating that the "Playstation 4" is a competitor of "Xbox One", "Nintendo Wii", "Nintendo Wii U", an "Xbox", an "Xbox 360", a "Nintendo Switch", and a "Nyko Playpad".

Figure 4:
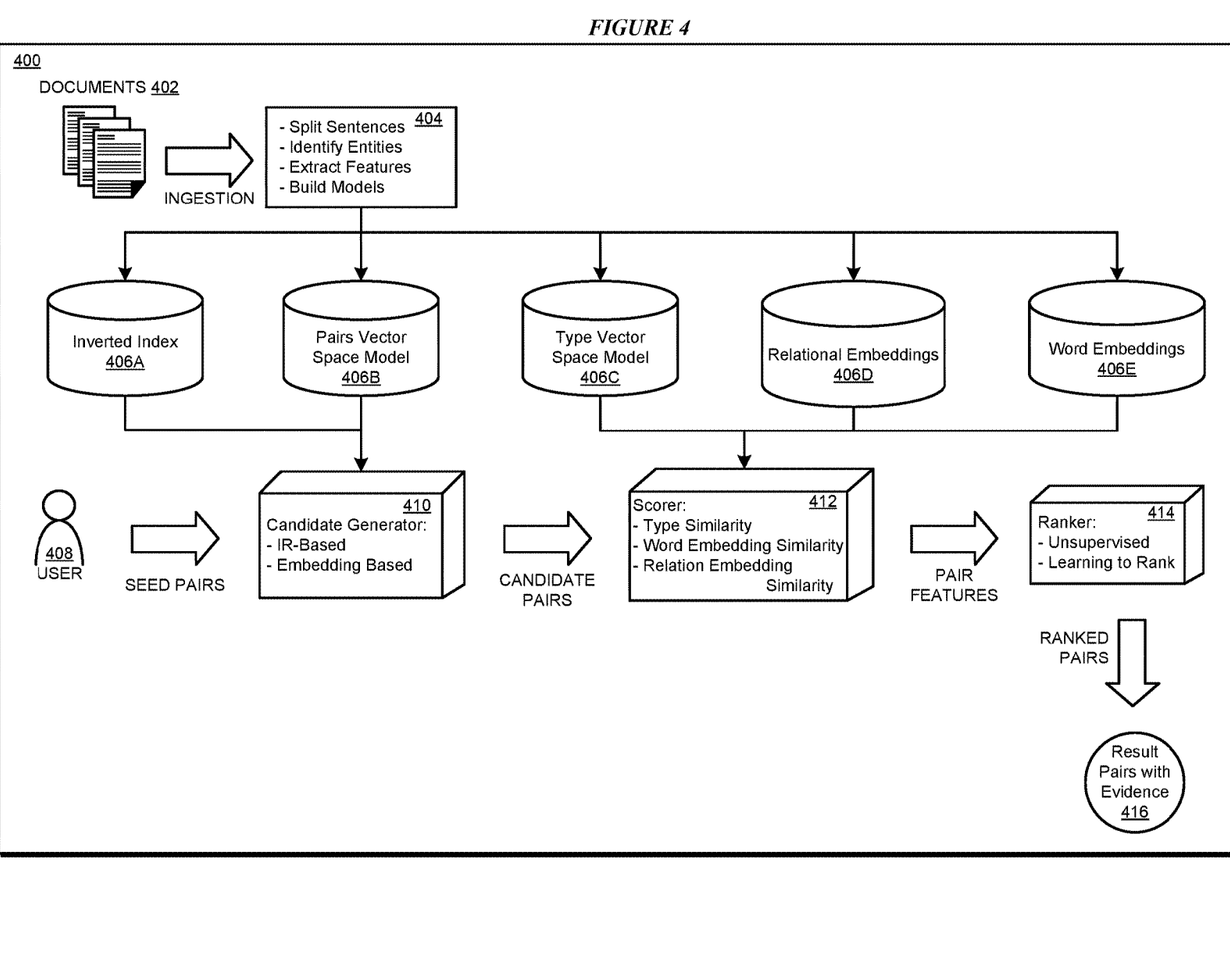
FIG. 4 depicts a block diagram of an example architecture for relation extraction from a corpus using an information retrieval based procedure in accordance with an illustrative embodiment.

With respect to FIG. 4, this figures depicts a block diagram of an example architecture 400 for relation extraction from a corpus using an information retrieval based procedure in accordance with an illustrative embodiment. The architecture 400 includes a set of documents 402 from a corpus that are ingested into an input component 404 of a cognitive application, such as cognitive application 107. In the embodiment, input component 404 performs processing on textual data within documents 402 to perform functions such as splitting sentences, identifying entities, extracting features, and building models. In the embodiment, the processed textual data is further processed and stored as one or more of an inverted index 406A, a pairs vector space model 406B, a type vector space model 406C, relational embeddings 406D, and a word embeddings 406E.

In the embodiment, a user 408 inputs one or more seed entity pairs to a candidate generator component 410, and candidate generator component 410 extracts candidate entity pairs based upon the seed entity pair and data from inverted index 406A and pairs vector space model 406B. In a particular embodiment, candidate generator component 410 utilizes an information retrieval-based procedure as described herein to generate the candidate pairs. Candidate generator component 410 provides the candidate pairs to a scorer component 412. In the embodiment, scorer component 412 utilizes type similarity, word embedding similarity, and/or relation embedding similarity procedure upon data retrieved from type vector space model 406C, relational embeddings 406D, and word embeddings 406E to determine pair features from the candidate pairs. In the embodiment, scorer component 412 provides the pair features to a ranker component 414. Ranker component 414 ranks the pair feature to generate a list of ranked pairs. In a particular embodiment, ranker component 414 ranks the pair features using one or more of unsupervised ranking and learning to rank procedure to rank the pair features to generate the ranked pairs. Ranker component 414 outputs the ranked pairs as result pairs with evidence 416.

Figure 5:
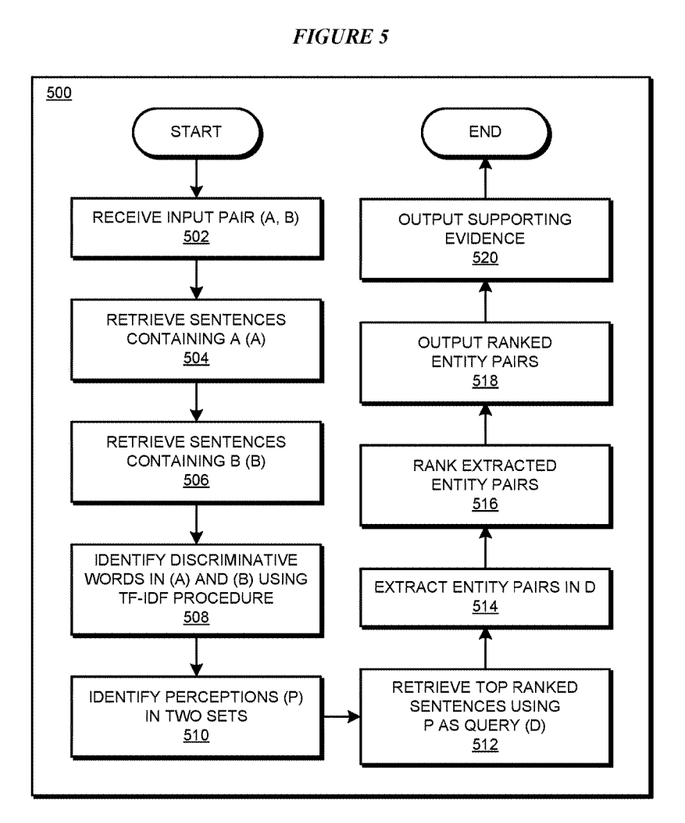
FIG. 5 depicts a flowchart of an example process for relation extraction from a corpus using an information retrieval based procedure in accordance with an illustrative embodiment.

With reference to FIG. 5, this figure depicts a flowchart of an example process 500 for relation extraction from a corpus using an information retrieval based procedure in accordance with an illustrative embodiment. In one or more embodiments, process 500 can be implemented in relation extraction application 105.

In block 502, relation extraction application 105 receives an input entity pair from a user including a first entity (a) and a second entity (b). In a particular embodiment, the first entity (a) and second entity (b) are associated by a particular relation. In a particular example, entity (a) is a "Person A" and entity (b) is an "Organization B" is which a relation between entity (a) and entity (b) is that "Person A" is the CEO of "Organization B". In block 504, relation extraction application 105 retrieves a first set of sentences or statements (A) from corpus 109 containing the first entity (a). In a particular embodiment, corpus 109 includes a set of textual documents such as web pages, electronic books, or articles. In block 506, relation extraction application 105 retrieves a second set of sentences or statements (B) from corpus 109 containing the second entity (b).

In block 508, relation extraction application 105 identifies discriminative words in the first set of sentences (A) to form a first set of discriminative words and the second set of sentences (B) to form a second set of discriminative words. In particular embodiments, a discriminative word is relevant to determining a relation between entities within the corpus. In a particular embodiment, relation extraction application 105 uses a term frequency-inverse document frequency (TF-IDF) procedure for determining discriminative words within the first set of sentences and the second set of sentences.

In block 510, relation extraction application 105 identifies perceptions (P) in the first set of discriminative words and the second set of discriminative words, ranks the perceptions, and selects a predetermined number of the ranked perceptions. In a particular embodiments, the perceptions include common words in the first set of discriminative words and the second set of discriminative words. In a particular embodiment, relation extraction application identifies perceptions (P) using an argument vector space model (VSM).

In block 512, relation extraction application 105 retrieves a predetermined number of top ranked sentences (D) from the corpus using perceptions (P) as a query. In block 514, relation extraction application 105 extracts candidate entity pairs in the ranked sentences (D) and ranks the extracted candidate entity pairs based on a frequency of the entity pairs in the ranked sentences (D).

In block 518, relation extraction application 105 outputs a list of the ranked output entity pairs. In block 520, relation extraction application 105 outputs supporting evidence supporting evidence for each extracted output entity pair including excerpts from the corpus indicative of the relation between the entities of the output pair. Process 500 is ended thereafter.

Thus, a computer implemented method, system or apparatus, and computer program product are provided in the illustrative embodiments for relation extraction from a corpus using an information retrieval based procedure and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for relation extraction from a corpus, the method comprising:
receiving an input entity pair including a first entity and a second entity, the first entity and the second entity being associated by a particular relation;
retrieving a first set of statements containing the first entity from a corpus;
retrieving a second set of statements containing the second entity from the corpus;
identifying, by a processor and a memory, a first set of discriminative words in the first set of statements;
identifying, by the processor and the memory, a second set of discriminative words in the second set of statements;
identifying perceptions in the first set of discriminative words and the second set of discriminative words;
retrieving a predetermined number of ranked statements from the corpus using the identified perceptions as a query;
identifying, in response to the query, candidate entity pairs, the candidate entity pairs including a third entity and a fourth entity; and
extracting candidate entity pairs from the predetermined number statements, the candidate entity pairs having a relation therebetween analogous to the relation between the first entity and the second entity.

2. The method of claim 1, further comprising:
ranking the extracted candidate entity pairs based on a frequency of the entity pairs in the ranked statements to form ranked output entity pairs.

3. The method of claim 2, further comprising:
outputting a list of the ranked output entity pairs.

4. The method of claim 2, further comprising:
outputting supporting evidence for at least one of ranked output entity pairs, the supporting evidence including excerpts from the corpus indicative of the relation between the entities of the output entity pair.

5. The method of claim 1, wherein the input entity pair is received from a user.

6. The method of claim 1, wherein the corpus includes a set of textual documents.

7. The method of claim 1, wherein identifying the perceptions in the first set of discriminative words and the second set of discriminative words further includes:
ranking the perceptions; and
selecting a predetermined number of the ranked perceptions.

8. The method of claim 1, wherein identifying the first set of discriminative words and identifying the second set of discriminative words is based upon a term frequency-inverse document frequency (TF-IDF) procedure.

9. The method of claim 1, wherein the perceptions include common words in the first set of discriminative words and the second set of discriminative words.

10. A computer usable program product comprising one or more computer-readable storage devices, and program instructions stored on at least one of the one or more storage devices, the stored program instructions comprising:
program instructions to receive an input entity pair including a first entity and a second entity, the first entity and the second entity being associated by a particular relation;
program instructions to retrieve a first set of statements containing the first entity from a corpus;
program instructions to retrieve a second set of statements containing the second entity from the corpus;
program instructions to identify, by a processor and a memory, a first set of discriminative words in the first set of statements;
program instructions to identify, by the processor and the memory, a second set of discriminative words in the second set of statements;
program instructions to identify perceptions in the first set of discriminative words and the second set of discriminative words;
program instructions to retrieve a predetermined number of ranked statements from the corpus using the identified perceptions as a query;
program instructions to identify, in response to the query, candidate entity pairs, the candidate entity pairs including a third entity and a fourth entity; and
program instructions to extract candidate entity pairs from the predetermined number statements, the candidate entity pairs having a relation therebetween analogous to the relation between the first entity and the second entity.

11. The computer usable program product of claim 10, further comprising:
program instructions to rank the extracted candidate entity pairs based on a frequency of the entity pairs in the ranked statements to form ranked output entity pairs.

12. The computer usable program product of claim 11, further comprising:
program instructions to output a list of the ranked output entity pairs.

13. The computer usable program product of claim 11, further comprising:
program instructions to output supporting evidence for at least one of ranked output entity pairs, the supporting evidence including excerpts from the corpus indicative of the relation between the entities of the output entity pair.

14. The computer usable program product of claim 10, wherein the input entity pair is received from a user.

15. The computer usable program product of claim 10, wherein the corpus includes a set of textual documents.

16. The computer usable program product of claim 10, wherein the program instructions to identify the perceptions in the first set of discriminative words and the second set of discriminative words further includes:
program instructions to rank the perceptions; and
program instructions to select a predetermined number of the ranked perceptions.

17. The computer usable program product of claim 10, wherein identifying the first set of discriminative words and identifying the second set of discriminative words is based upon a term frequency-inverse document frequency (TF-IDF) procedure.

18. The computer usable program product of claim 10, wherein the computer usable code is stored in a computer readable storage device in a data processing system, and wherein the computer usable code is transferred over a network from a remote data processing system.

19. The computer usable program product of claim 10, wherein the computer usable code is stored in a computer readable storage device in a server data processing system, and wherein the computer usable code is downloaded over a network to a remote data processing system for use in a computer readable storage device associated with the remote data processing system.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to receive an input entity pair including a first entity and a second entity, the first entity and the second entity being associated by a particular relation;

program instructions to retrieve a first set of statements containing the first entity from a corpus;

program instructions to retrieve a second set of statements containing the second entity from the corpus;

program instructions to identify, by a processor and a memory, a first set of discriminative words in the first set of statements;

program instructions to identify, by the processor and the memory, a second set of discriminative words in the second set of statements;

program instructions to identify perceptions in the first set of discriminative words and the second set of discriminative words;

program instructions to retrieve a predetermined number of ranked statements from the corpus using the identified perceptions as a query;

program instructions to identify, in response to the query, candidate entity pairs, the candidate entity pairs including a third entity and a fourth entity; and program instructions to extract candidate entity pairs from the predetermined number statements, the candidate entity pairs having a relation therebetween analogous to the relation between the first entity and the second entity.

* * * * *